Oct. 18, 1966 R. W. THOMPSON 3,279,342

COMMUNICATION PRINTER

Filed Sept. 1, 1964 2 Sheets-Sheet 1

INVENTOR
ROBERT W. THOMPSON
BY Stanley Z. Cole
Donald F. Daley
ATTORNEYS

INVENTOR
ROBERT W. THOMPSON
BY Stanley Z. Cole
Donald L. Daley
ATTORNEYS

United States Patent Office 3,279,342

Patented Oct. 18, 1966

3,279,342

COMMUNICATION PRINTER

Robert W. Thompson, Penfield, N.Y., assignor to Xerox Corporation, Rochester, N.Y., a corporation of New York Filed Sept. 1, 1964, Ser. No. 393,699

10 Claims. (Cl. 95—4.5)

This invention relates to printers, and, particularly, to optical devices used in printers.

More specifically, this invention relates to printers of the type wherein a photosensitive surface is exposed, in a line-by-line progression, to light images of alphanumerical characters. The invention is concerned with a device by which an array of characters are selectively illuminated and a light image of the characters is intensified and conveyed to a photosensitive surface through a light path which results in the characters appearing in in-line orientation on the photosensitive surface.

Communication printers receive an electrical signal input which must be converted to alphanumerical characters and printed on copy paper. The present invention provides apparatus for translating incoming electrical signals into light images of characters by illuminating areas of a plate containing a series of vertical columns with each of the various characters to be reproduced and bringing the particular characters illuminated into online orientation to expose a photosensitive surface a line at a time.

A device for bringing optical images into on-line orientation is disclosed in Patent No. 2,725,786, entitled "Optical Card Reading Apparatus." The device disclosed in this patent visually displays characters, corresponding to the punched holes in a data processing card, in a straight line, for ease of reading. The invention herein improves on the basic principles of the patent and provides an optical device in a communication printer wherein the characters are selectively illuminated, intensified, and printed in response to electrical signals. The printer included herein further distinguishes from the cited art by providing converging light relaying surfaces which concentrate light images on a photosensitive surface.

It is the primary object of this invention to intensify and align light images of off-axis informational elements.

It is also an object of this invention to provide a communication printer wherein a photosensitive surface is exposed to an in-line array of intensified light images of alphanumerical characters in a line-by-line sequence.

It is a further object of this invention to improve communication printers to bring light images of illuminated characters from a rectangular character plate into online orientation to expose a photosensitive surface in a line-by-line sequence.

It is a further object of this invention to improve communication printers to reduce light losses due to reflection of light images through an optical path.

It is a further object of this invention to improve communication printers of the type wherein a photosensitive surface is exposed to a light image of the characters to be printed, to increase the amount of light at the photosensitive surface without increasing the light source.

It is a further object of this invention to improve communication printers to readily accommodate complete changes of characters or character style inexpensively.

It is a further object of this invention to provide a communication printer with an optical input having no moving parts and having the capability of producing a complete selection of desired characters at any horizontal position.

These and other objects of the invention are attained by means of a pair of converging reflective surfaces mounted between an image input position and an image output position.

A preferred embodiment of the apparatus is shown in the appending drawings in which:

FIG. 4 is a schematic illustration of the spatial orientation of conventional projection optics.

Figures 1, 2, 3:
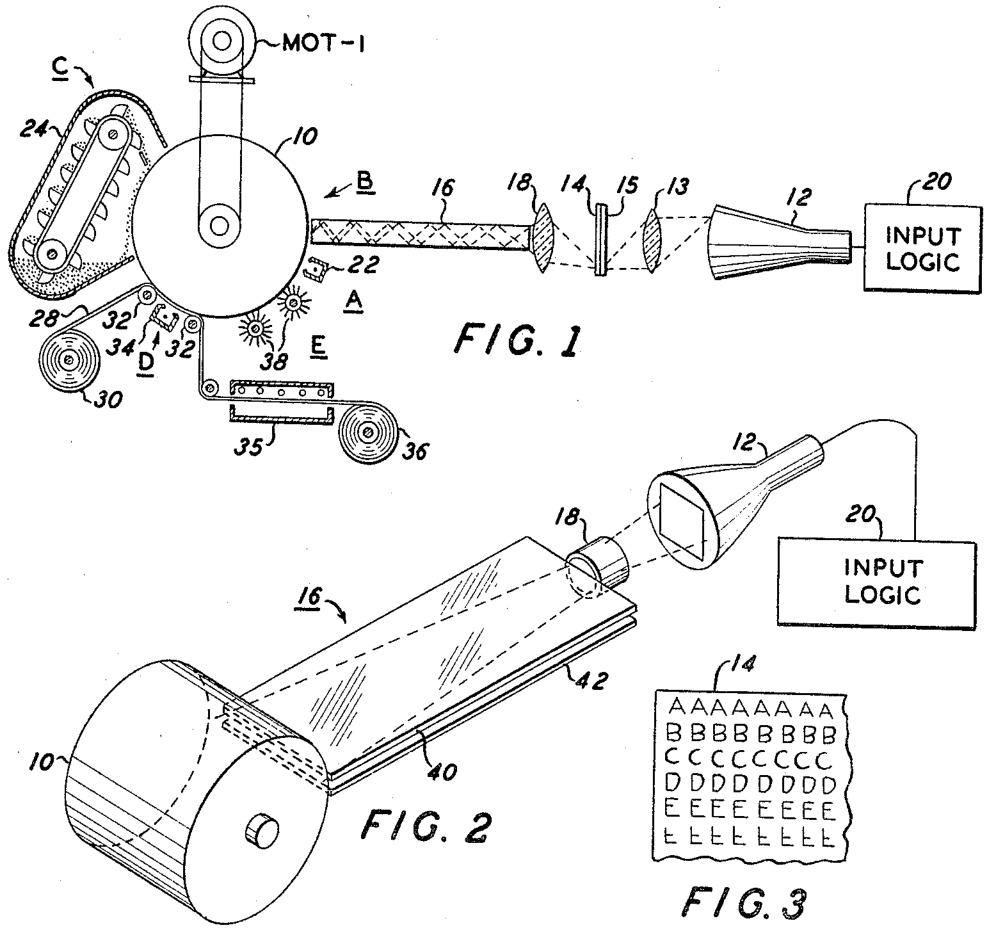
FIG. 1 is a schematic view of a communication printer constructed in accordance with the present invention.
FIG. 2 is a perspective of one embodiment of the optical system used in the device shown in FIG. 1.
FIG. 3 is a front fragmentary view of a portion of the character plate used in the device shown in FIG. 1.

FIGURE 1 shows a schematic representation of one embodiment of a communication printer. The printer contains a xerographic drum 10 having a photoconductive surface thereon; a flying spot cathode ray tube 12; a relay lens 13 in front of the cathode ray tube; a field lens 15 in front of an opaque plate 14, containing an array of transparent alphanumerical characters, positioned in front of the relay lens 13 and the cathode ray tube 12; a projection lens 18, a character positioning element 16 adapted to convey light images from the lens 18 to the xerographic drum 10; and an input logic 20, operatively connected to the cathode ray tube 12 to position the light spot of the cathode ray tube relative to the matrix on the plate 14 in response to an electrical signal.

The apparatus shown herein for translating optical images to printed words on a sheet of paper is a xerographic apparatus which is well known in the art. The same results may be accomplished by using any photosensitive surface in place of the xerographic drum 10; however, a xerographic apparatus has been shown as illustrative of the type that may be used. The drum 10 containing a photoconductive surface, which is normally an insulating surface in the dark, is driven through a series of process stations by a motor MOT–1. The motor MOT–1 is adapted to advance the drum a line at a time. That is, after exposure of one line on the drum surface, the drum is advanced one line by the motor MOT–1. The drum is stopped as each line is printed so that the characters appear on the drum surface in a straight line. It is also possible to skew the glass plate relative to the drum axis so that a line may be exposed with the drum moving without producing distortion of the line.

As the drum 10 is driven by the motor MOT–1 past a charging station A, a corotron 22 places a uniform electrostatic charge on the surface of the drum. The drum then rotates to an exposure station B wherein the drum surface is exposed to a light image of the characters to be printed. The light of the images renders the photoconductive surface conductive rather than insulating and discharges the electrostatic charge in the image areas so that the drum surface contains uncharged areas in image configuration. The drum then rotates to developing station C wherein a developer material containing a triboelectric charge of the same polarity as the charge on the drum surface is cascaded over the surface of the drum. The developer material consists of a finely divided, pigmented, resinous powder herein refererd to as "toner" carried on the surface of glass beads herein referred to as "carrier particles." The developer material is supplied from a reservoir in the bottom of the developer housing 24 to the plate surface by means of a conveyor 26 and is cascaded over the drum surface back to the reservoir at the bottom of the developer housing. The carrier particles carry the toner material from the reservoir to the drum surface and upon contact with the non-charged image areas the toner material adheres to the drum surface, while in the non-image or charged areas the toner material is repelled by the charge on the drum surface and returns with the carrier material to the reservoir. Thus, a powder image of the light image to which the drum was exposed at station B is developed on the drum surface. The drum then rotates past a transfer station D wherein a web of paper or other suitable material 28 is supplied from a supply roll 30 over a pair of guide rollers 32 into contact with the surface of the xerographic drum. A transfer corotron 34 places an electrostatic charge on the surface of the web of paper while the paper is in contact with the drum surface. The electrostatic charge is of opposite polarity to the charge on the toner material and thus attracts the toner material from the surface of the drum onto the web of paper. The paper then passes through a heat fuser 35 wherein heat supplied to the paper and the toner material causes the toner to coalesce and bond to the surface of the web. The web then contains a permanent image of the powder image transferred from the drum surface to the paper and is accumulated on a takeup roll 36. After the transfer operation, the drum is rotated past a cleaning station E wherein a pair of rotating brushes 38 remove any resdiual powder from the drum surface prior to recharging and re-exposing the drum. The operation of a xerographic apparatus is well known in the art and does not require a detailed discussion herein.

FIGURE 2 illustrates a system wherein a cathode ray tube provides a high intensity light spot behind selective characters on a plate. The plate 14 is constructed of opaque material with an array of transparent characters thereon. The character plate 14 may be exposed photographic film with unexposed character areas, or any other suitable material that will give high character resolution and contrast. The plate contains vertical columns having all the character symbols required of the printer and contains as many identical columns as are required to form a printed line across the width of the copy being printed. A segment of the character plate 14 is shown in FIG. 3.

As shown herein, the plate 14 is mounted adjacent to the exterior face of the cathode ray tube with a relay lens 13 interposed to focus the light spot on the plate and a field lens 15 adjacent to the plate to direct the light rays toward the projection lens 18. However, the plate may be mounted internally in the tube on the phosphor surface. Also, when the plate is mounted outside the tube it is sometimes advantageous to eliminate overlap of the light spot on more than one character by conveying the light from the phosphor surface to the particular spot desired by fiber optic bundles running from inside the tube face to the characters.

The projection lens 18 normally would reproduce the spatial orientation of each illuminated character at a focal plane tangent to the drum and perpendicular to the optical projection axis. The embodiment of element 16 shown in FIG. 2 has two parallel mirrors 40 and 42 which serve to intercept the light leaving the projection lens in such a manner as to optically displace all characters, disposed vertically in the image plane, to the optical axis while their horizontal positions remain unaffected. Thus, a capability is created for a simple optical input with no moving parts and with a complete character choice at every horizontal character position.

The system has the added flexibility of readily and inexpensively accommodating complete changes in the character font style, or the incorporation of special symbols peculiar to varying applications by simply replacing the entire character plate.

The embodiments shown herein use a cathode ray tube for the character selecting light source since it is especially suited for rapid writing from electrical signals from either transmission lines or computer input after being translated by the input logic 20.

For purposes of illustrating the relationship between the character plate, the projection lens and the image plane, FIG. 4 shows a schematic representation whereby the characters on the character plate pass through a projection lens and are focused on an image plane. For simplicity the rays of each character are drawn to represent only the rays from the center of each character that pass through the projection lens. In order to focus all the characters from the plate onto the optical axis at the image plane rather than in the spatial orientations shown, the parallel mirrors 40 and 42 are placed between the projection lens and the image plane as shown in FIG. 2. The light rays from the characters on the plate then pass through the projection lens and are immediately intercepted by the reflective surfaces of the mirrors 40 and 42. Each of the characters is reflected between the mirrors 40 and 42 through a light path equivalent in length to the original light path from the projection lens to the image plane. The number of reflections of each character between the mirrors 40 and 42 is dependent upon its position above or below the optical axis. It should be noted that the centrally located character in the column does not experience any reflection in the parallel mirrors while each successive character above and below experienced reflections in number equal to their numerical position from the central character. Therefore, in order to have the characters all appear upright at the photosensitive surface their orientation in the vertical sense must be alternated on the character plate as shown in FIG. 3.

Figure 5:
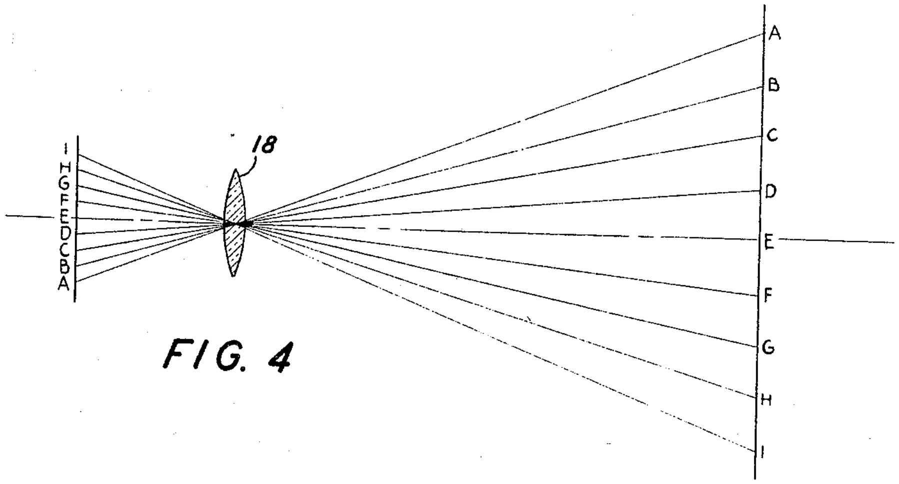
FIG. 5 is a perspective view of an embodiment of the optical system used in the apparatus of FIG. 1 wherein a solid glass sheet with parallel surfaces is used; and, FIG. 6 is a perspective view of another embodiment of the optics system used in the apparatus of FIG. 1, wherein the reflective surfaces converge in the direction of projection.

The light loss due to multiple reflection from an illuminized mirror surface is 3% to 5% loss per reflection. This loss may be eliminated by replacing the pair of mirrors with a single optically ground sheet of glass as shown in FIG. 5. The reflection path will then be entirely within the sheet of glass, utilizing the principle of total internal reflection and eliminating the losses encountered with the mirrored surfaces. When the solid glass sheet is used the length of the sheet must be varied by the index of refraction of the light rays entering the glass sheet. Whereas, in the case of the parallel mirrors, the light rays never enter the glass so that the length of the mirrors is approximately the same as the distance that the light ray at the optical axis travels from the projection lens to the image plane. In the case of the sheet of glass, the length of the sheet is determined by taking the light path in air from the projection lens to the image plane and multiplying it by the index of refraction of the glass. This added length compensates for the changing of the angle of the light path as it enters the glass sheet and thus the angle at which the light rays intercept the surfaces of the glass sheet during reflection toward the image plane. The spacing or separation of the reflective surfaces is equal to the vertical center to center distance between the characters in the projected image plane.

Figure 6:
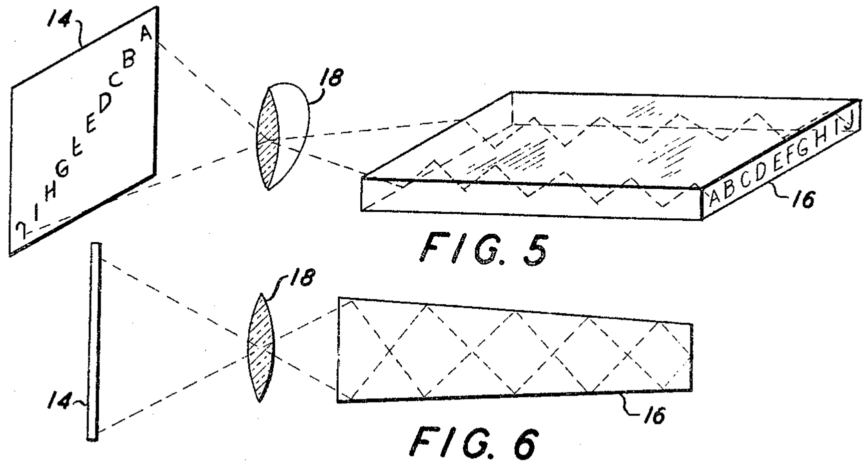

FIGURE 6 shows an embodiment of the reflective surfaces which may be constructed of either a single sheet of glass or a pair of mirrored surfaces in the same manner as described above. However, the reflective surfaces whether they be from internal reflection in a sheet of glass or from mirrored surfaces, are not parallel as in this embodiment. They are, rather, constructed to uniformly converge from the projection lens toward the image plane. In this manner, a larger gap between the reflective surfaces is exposed to the projection mirror thus permitting a greater amount of light to enter between the two reflective surfaces and to extend the field of the lens. This arrangement changes the angle of incidence of the light rays with the reflective surfaces. If a solid glass sheet is used the angle of convergence of the two surfaces must be maintained within limits such that the angle of the light rays from the characters furthermost from the center of the plate do not intercept the outer surfaces of the glass sheet at an angle exceeding the critical angle and thereby not being internally reflected.

In operation, a plate of the type shown in FIG. 3, containing a font of characters, arranged in vertical columns containing each of the characters to be used in the printing process and horizontal rows of identical characters is placed on the face of the cathode ray tube or adjacent to the tube with a relay lens interposed between the tube and the plate. A signal is received from a remote source, such as a communications transmitter or a computer output and, through the input logic 20, is used to control the orientation of the light spot of the cathode ray tube. If a character is to be printed in a given position then the spot of the cathode ray tube illuminates a character in the corresponding column on the plate in response to the input signal. The light passing through the plate is focused by the projection lens and intercepted by the transmitting element 16 and internally reflected to the photosensitive surface 10. After the photosensitive surface 10 has been exposed to a full line of print the drum is stepped by one line and the spot in the cathode ray tube again starts to scan the character plate for the printing of the next line.

While the invention has been described in a xerographic communications printer, it is not intended to be confined to the specific details of the embodiment disclosed. The invention is intended to cover such modifications or changes as may come within the purpose or the scope of the following claims.

What is claimed is:

1. An optical device for use in presenting off-axis images in an on-axis array including:

a pair of reflective surfaces converging from an image input position to an image output position, means to direct light rays of images from off-axis locations between the reflective surfaces at the image input position, and means to intercept the light images as they emerge from the converging surfaces at the image output position.

2. Apparatus for intensifying and aligning images from off-axis sources including:

reflective surfaces extending between a light image input position and a light image output position, said reflective surfaces converging toward the image output position whereby light reflected between the surfaces is intensified as it is traveled from the image input position to the image output position, means to direct light rays of illuminated images, from off-axis positions, between the reflective surfaces at the image input position whereby the images are reflected between the surfaces to the image output position, and means at the image output position to intercept the intensified light images reflected by the surfaces.

3. In a printer of the type wherein light images are used in the production of printed copy, apparatus for intensifying and aligning light images from off-axis sources including:

means to selectively illuminate informational elements arranged in columns and rows at an information input position, light reflecting surfaces extending from the informational input position to an informational output position, said light reflecting surfaces converging from the informational input position to the information output position, a projection lens positioned at the informational input position to project light images of illuminated informational elements between the reflective surfaces to be conveyed and intensified thereby to the informational output position, and means at the informational output position to intercept light images emerging from the reflective surfaces whereby the light images appear in in-line configuration.

4. A printer of the type wherein light information in disarray is simultaneously amplified and aligned including:

information input means to present an array of informational elements arranged in columns and rows, each column having all the informational elements and each row having only one of the elements, means to selectively illuminate a single element in any position in each column, a pair of converging reflective surfaces extending to an information output position from a point in front of said information input means, and a projection lens positioned between the information input means and the reflective surfaces to project light images of the illuminated elements between the reflective surfaces to be reflected thereby to the information output position, the intensity of illumination of said reflected elements being increased at said information output position by being reduced in size during passage between said converging reflective surfaces and said elements being simultaneously aligned in a row.

5. A communication printer of the type wherein a photosensitive surface is sequentially exposed to lines of light images of alphanumerical characters in accordance with electrical signals including:

a photosensitive surface adapted for movement past an exposure station;

an opaque plate having an array of transparent characters arranged in columns and rows, the number of columns being equal to the number of printing spaces in a line on the photosensitive surface and the number of rows being equal to the number of characters capable of being printed, each column having all the different characters to be printed, and each row having only one of the characters to be printed;

means to selectively illuminate any character in each column;

a pair of converging reflective surfaces extending from a position immediately adjacent the photosensitive surface at the exposure station to a point in front of the opaque plate;

a projection lens positioned between the opaque plate and the reflective surfaces to project light images of the illuminated characters in the matrix between the reflective surfaces to be reflected thereby to the photosensitive surfaces; and means to advance the photosensitive surface in timed relation to the projection of each line of images.

6. A communication printer of the type wherein a photosensitive surface is sequentially exposed to lines of light images of alphanumerical characters in accordance with electrical signals including:

a photosensitive surface adapted for movement past an exposure station;

an opaque plate having an array of transparent characters arranged in columns and rows, the number of columns being equal to the number of printing spaces in a line on the photosensitive surface and the number of rows being equal to the number of characters capable of being printed and each column having all the different characters to be printed, and each row having only one of the characters to be printed;

a pair of converging reflective surfaces extending from a position immediately adjacent the photosensitive surface at the exposure station to a point in front of the opaque plate to reflect light images if illuminated characters into in line orientation at the photosensitive surface;

a projection lens positioned between the opaque plate and the reflective surfaces to project light images of the illuminated characters between the reflective surfaces to be reflected thereby to the photosensitive surface;

means to selectively illuminate characters in the opaque plate in response to electrical signals received from a remote source;

and means to advance of the photosensitive surface in timed relation to the projection of each line of images.

7. A communication printer of the type wherein a photosensitive surface is sequentially exposed to lines of light images of alphanumerical characters in accordance with electrical signals including:

a photosensitive surface adapted for movement past an exposure station;

an opaque plate having an array of transparent characters arranged in columns and rows, the number of columns being equal to the number of printing spaces in a line on the photosensitive surface and the number of rows being equal to the number of characters capable of being printed and each column having all the different characters to be printed, and each row having only one of the characters to be printed;

means to selectively illuminate the characters on the opaque plate;

a pair of converging reflective surfaces extending from a position immediately adjacent the photosensitive surface at the exposure station to a point in front of the opaque plate to reflect light images of illuminated characters into in line orientation at the photosensitive surface;

a projection lens positioned between the opaque plate and the reflective surfaces to project light images of the illuminated characters between the reflective surfaces to be reflected thereby to the photosensitive surface;

means to control the selective illumination of characters in the opaque plate in response to electrical signals received from a remote source;

and means to advance of the photosensitive surface in timed relation to the projection of each line of images.

8. The apparatus of claim 6 wherein the reflective surfaces are spaced apart, at the photosensitive surface, by a distance substantially equal to the center to center distance of the characters in adjacent lines on the photosensitive surface and uniformly converge toward the photosensitive surface.

9. The apparatus of claim 6 wherein the reflective surfaces are polished outer surfaces of a solid glass sheet, and the projection lens is adapted to project light rays into the end of the glass sheet at an angle such that the light rays are internally reflected thereby.

10. A communication printer including:

a xerographic drum having a photoconductive surface adapted to rotate through a series of processing stations including an exposure station;

means to place a uniform electrostatic charge on the photoconductive surface;

an opaque plate having an array of transparent characters arranged in columns and rows, the number of columns being equal to the number of printing spaces in a line on the photosensitive surface and having all the different characters to be printed, and the number of rows being equal to the number of characters capable of being printed and having all the same characters;

a cathode ray tube positioned adjacent to the opaque plate to illuminate the characters thereon;

a pair of converging reflective surfaces extending from a position immediately adjacent the photoconductive surface to a point in front of the opaque plate;

a projection lens positioned between the opaque plate and the reflective surfaces to project light images of the illuminated characters between the reflective surfaces to be reflected thereby to the photoconductive surface;

and means to control the cathode ray tube to selectively illuminate characters on the opaque plate in response to electrical signals received from a remote source;

means to effect line-by-line advance at the photoconductive surface in timed relation to the projection at each line of images;

and means to develop a powder image on the photoconductive surface in image configuration of the characters exposed to the drum surface.

References Cited by the Examiner

UNITED STATES PATENTS 2,887,935 5/1959 Scott ---------------- 95—4.5

JOHN M. HORAN, *Primary Examiner.*